May 1, 1956 J. H. APEL ET AL 2,743,798
COMBINATION CLUTCH AND GEAR SHIFT CONTROL FOR MIXER UNITS
Filed Feb. 15, 1955 5 Sheets-Sheet 1

INVENTORS
JOHN H. APEL
DONN W. DUFFEY
BY
ATTORNEYS

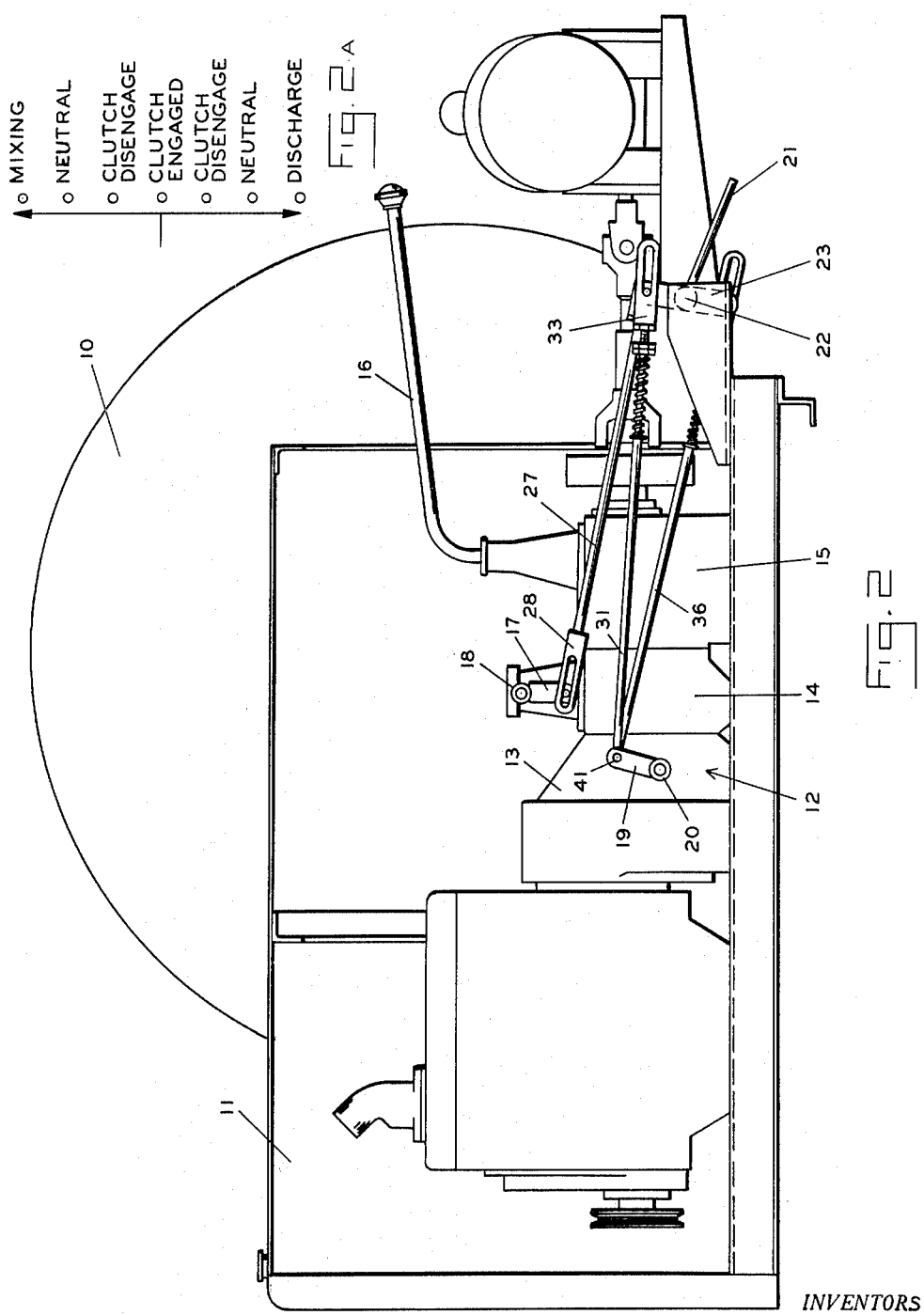

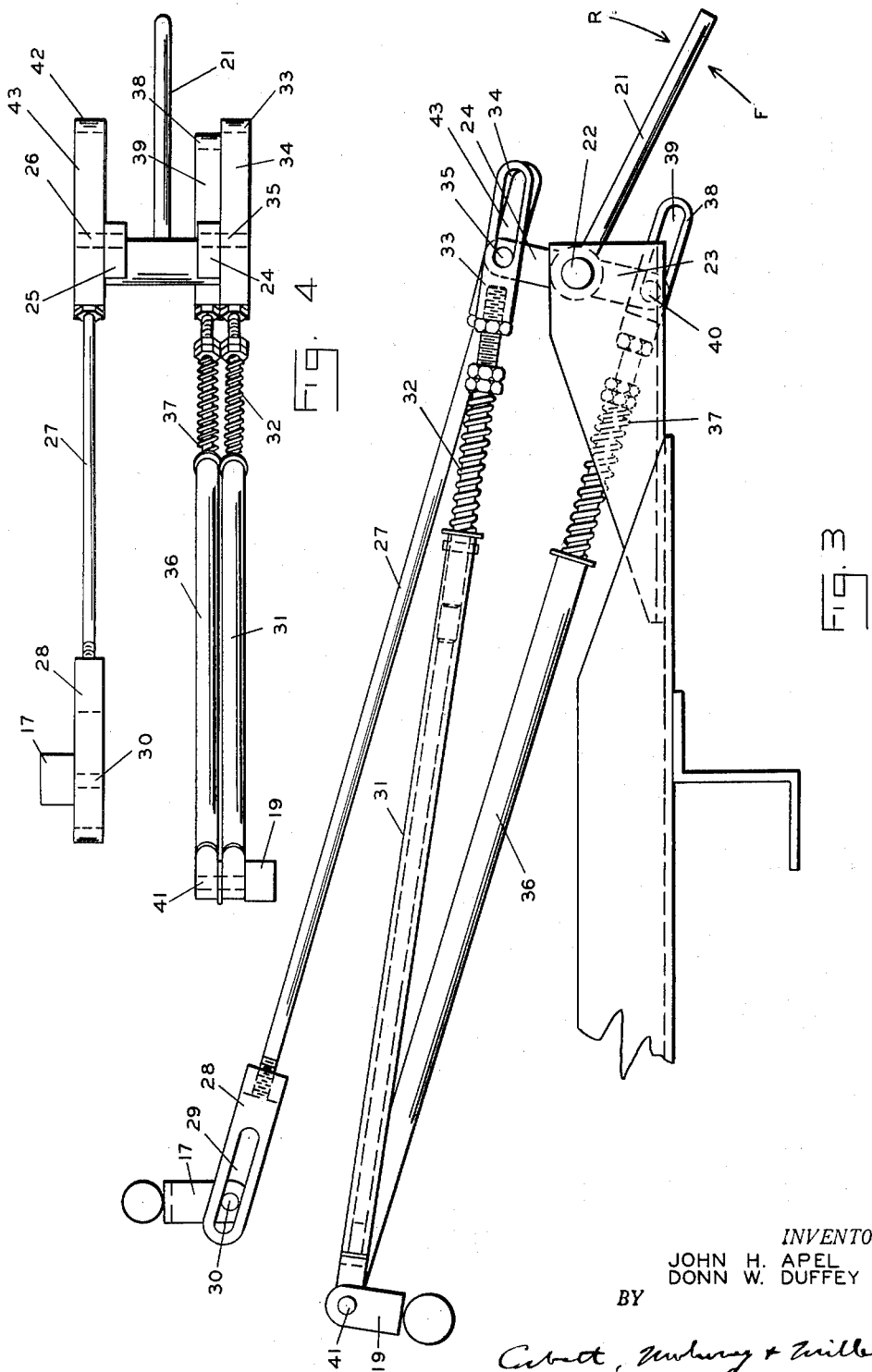

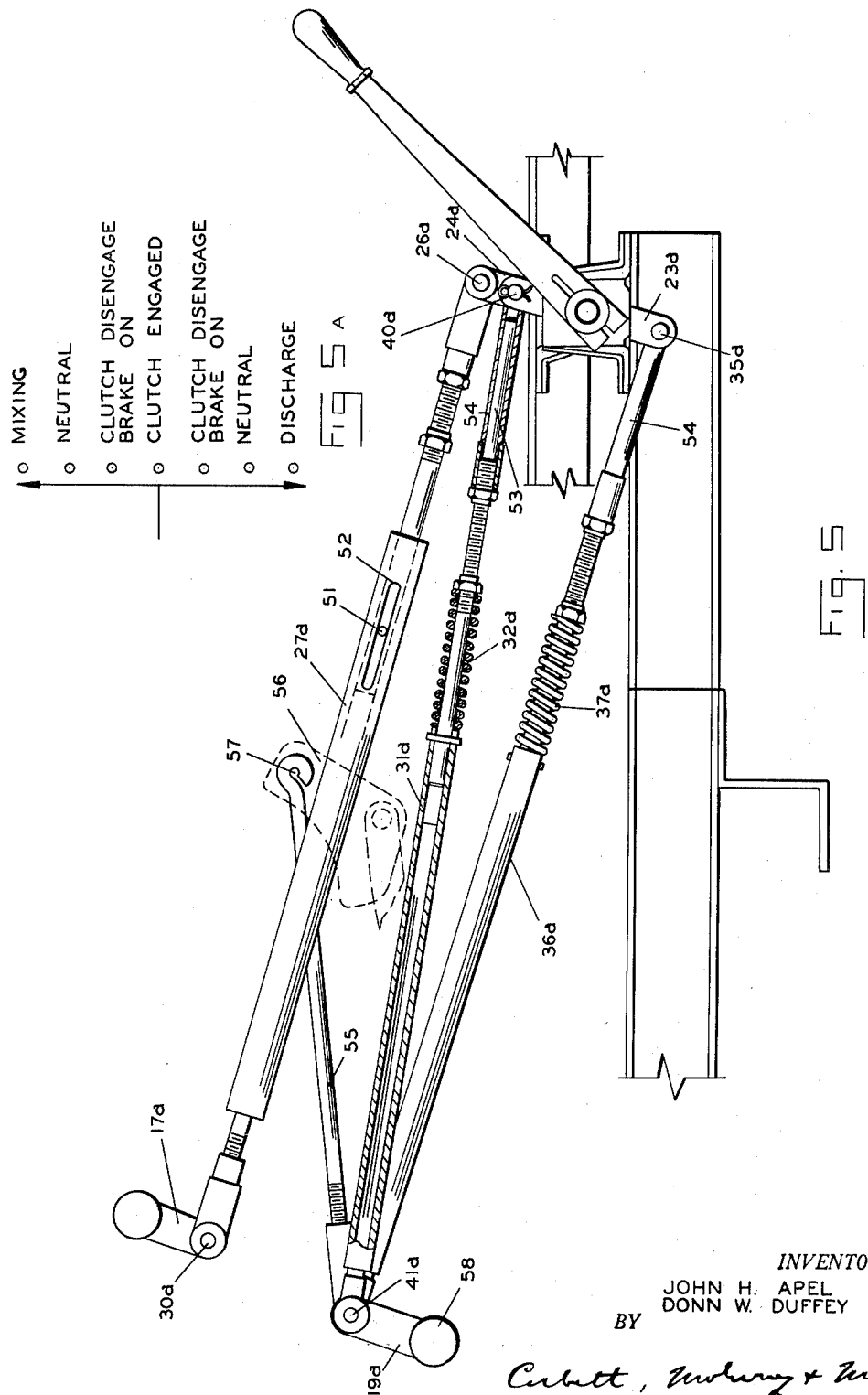

May 1, 1956
J. H. APEL ET AL
2,743,798
COMBINATION CLUTCH AND GEAR SHIFT CONTROL FOR MIXER UNITS
Filed Feb. 15, 1955
5 Sheets-Sheet 5
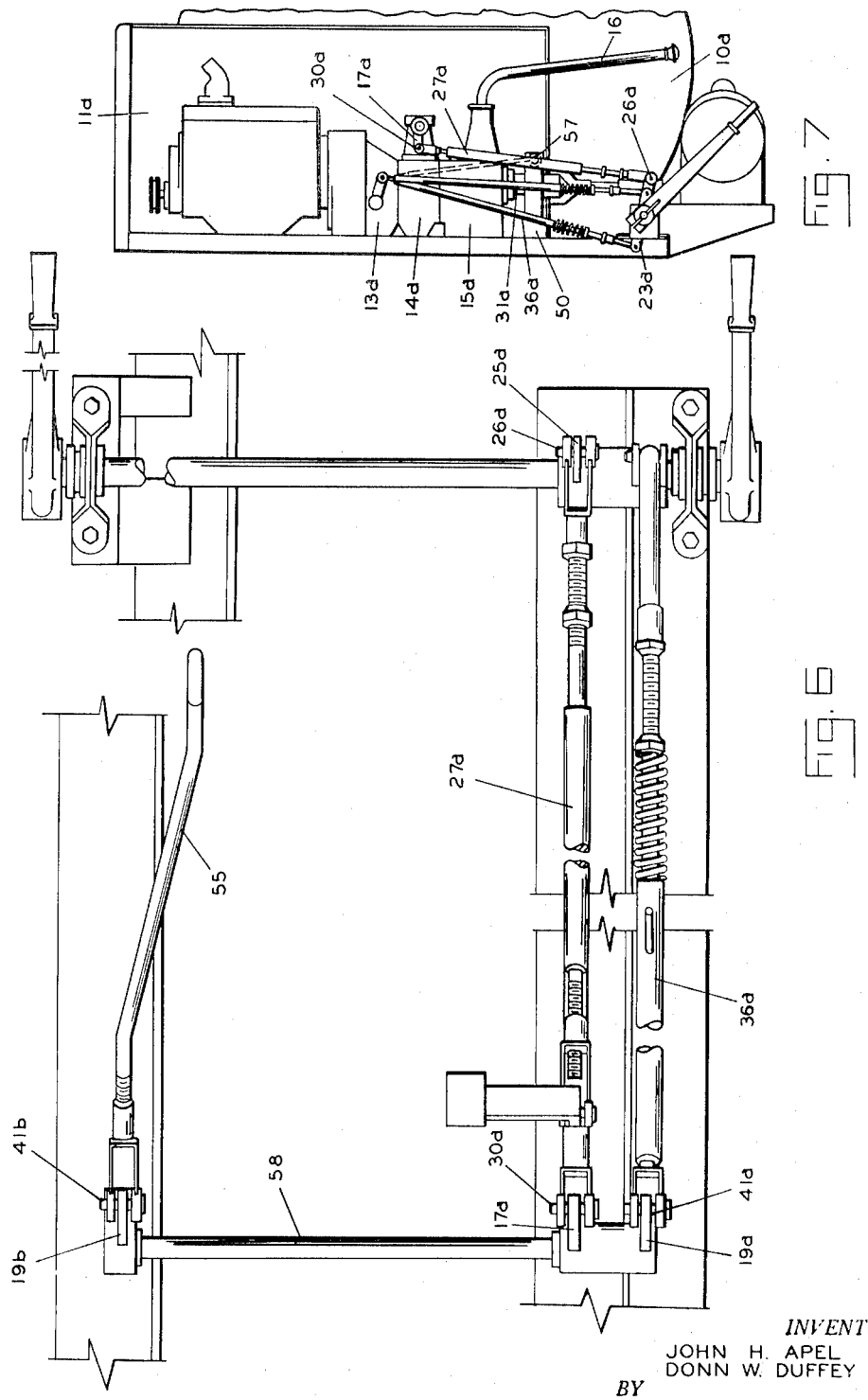
INVENTORS
JOHN H. APEL
DONN W. DUFFEY
BY
ATTORNEYS

United States Patent Office 2,743,798
Patented May 1, 1956

2,743,798

COMBINATION CLUTCH AND GEAR SHIFT CONTROL FOR MIXER UNITS

John H. Apel and Donn W. Duffey, Columbus, Ohio, assignors to The Jaeger Machine Company, Columbus, Ohio, a corporation of Ohio Application February 15, 1955, Serial No. 488,226

15 Claims. (Cl. 192—3.5)

Our invention relates to a combination clutch and gear shift control for mixer units. It has to do, more specifically, with control mechanism which can be actuated to control simultaneously the clutch and to shift a forward and reverse drive unit used for driving the rotatable drum of a mixer unit, for example, of a truck mixer unit.

It is the main object of our invention to provide a simple and inexpensive clutch and gear shift control unit in which a single lever is used to release the clutch and shift the forward and reverse drive gears, and in which the clutch is then automatically engaged to drive the mixer drum in the selected direction, either for mixing or for discharge.

The preferred embodiment of our invention is illustrated in the accompanying drawings wherein similar characters of reference designate corresponding parts and wherein:

Figure 2 is a side view of our control mechanism showing it associated with the clutch unit and the reverse gear unit of the mixer unit.

Figure 2a is a diagram illustrating the sequence of operations of the control mechanism of Figure 2.

Figure 3 is a detail in side elevation of the control mechanism.

Figure 4 is a plan view of the mechanism of Figure 3.

Figure 5 is a detailed view in side elevation showing a different form of the control which includes means for actuating a brake unit for the mixer drum whenever the clutch is disengaged.

Figure 5a is a diagram illustrating the sequence of operations of the control mechanism of Figure 5.

Figure 6 is a detailed plan view of the arrangement of Figure 5.

Figure 7 is a schematic view showing the relationship of the control mechanism to the units which it controls.

Figure 1:
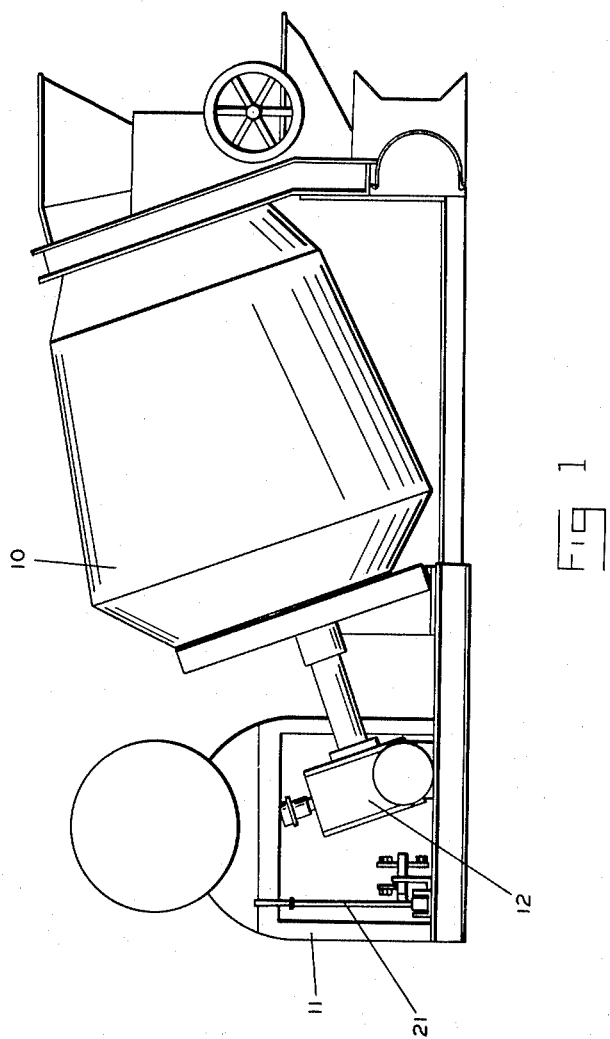
Figure 1 is a diagrammatic view illutsrating our combination clutch and gear shift control mechanism applied to a mixer unit.

With reference to the drawings, in Figure 1 we have illustrated a type of mixer unit to which our invention may be applied and which is adapted to be mounted on a truck or other vehicle. This unit consists of a mixing drum 10 which is supported for rotation about its axis and is driven by an engine 11 through a suitable transmission unit 12.

The transmission 12, as indicated in Figure 2, includes the driving clutch 13, the forward and reverse gear unit 14, and the multi-speed gear unit 15. The unit 13 is a spring-loaded clutch of the automotive type which must be released each time the gears of the unit 14 are shifted and then engaged to drive the mixing drum 10 in either a forward or a reverse direction. The unit 14 may be of any suitable type of gear unit which can be shifted to selectively drive the mixing drum in either a forward or a reverse direction. The unit 15 may be of the standard change speed type and can be set for a selected speed by means of the lever 16. The reversing gear unit 14 is actuated by a depending lever 17 pivoted at 18 and the unit 13 is actuated by an upstanding lever 19 pivoted at 20.

We provide actuating mechanism of such a nature that by merely shifting a single operating lever between forward and reverse drive positions, the levers 17 and 19 will be actuated to first release the clutch 13 and then to shift the gears of unit 14, and then, when the lever is released, the clutch will be automatically re-engaged. The single operating lever is designated at 21 and may be extended to any suitable control position or positions on the mixer unit. It is pivoted by the shaft 22 to a suitable rigid support on the mixer unit.

The details of this actuating mechanism are shown best in Figures 3 and 4. Formed as a part of the operating lever 21 is a cross arm which provides a single arm 23 at one side of the pivot shaft and a diametrically opposed double arm at the opposite side of the shaft which has the arm portions 24 and 25 that are axially spaced relative to the pivot shaft 22.

The arm 25 is pivoted by the pivot pin 26 to one end of a solid rod 27. The pin 26 fits in a slot 43 which is formed in a clevis 42 that is axially adjustably connected to the rod 27. The opposite end of the rod 27 is provided with a clevis 28 which is axially adjustably mounted thereon and which is provided with the slot 29 that cooperates with the pivot 30 carried by the arm 17 of the forward and reverse gear unit 14. When the lever 21 is in normal or clutch-engaged position (Figure 3) the pin 30 is intermediate the ends of the slot 29 and the unit 14 is in a previously set position so that the mixing drum 10 is rotating in a selected direction.

The arm 24 is pivoted to one end of an actuating rod 31 which has an axially yieldable section including a compressible spring 32. This end of the rod is provided with a clevis 33 which is axially adjustably mounted thereon and which is provided with a slot 34 that cooperates with a pin 35 carried by the arm 24. The opposite end of the rod 31 is connected by a pivot 41 to the upper end of the clutch-actuating lever 19. The arm 23 is pivoted to one end of an actuating rod 36 which has an axially yieldable section including a compressible spring 37 and is provided with a clevis 38 which is axially adjustably mounted thereon and which has a slot 39 that cooperates with a pin 40 carried by the arm 23. The other end of the rod 36 is connected by the pivot 41 to the upper end of the clutch-actuating lever 19. With the operating lever 21 in clutch-engaged position, as in Figure 3, the pin 35 is in the left-hand end of the slot 34 and the pin 40 is in the left-hand end of the slot 39, as shown in Figure 3, so that the lever 19 is in such a position that the driving clutch is engaged. The pin 26 will be in the slot 43 in the position shown in Figure 4. The springs 32 and 37, which are balanced against each other, will normally tend to expand and, therefore, to center the lever 21 in clutch-engaged position, as shown in Figure 3.

The sequence of operations of the control mechanism is illustrated in Figure 2a. The clutch 13 is normally engaged and when the operating lever 21 is shifted, in either direction, the clutch will first be disengaged and then the unit 14 will be shifted to drive the drum in the selected direction which will be forward drive for mixing and reverse drive for discharging.

Thus, it will be apparent that shifting the lever 21 in a forward drive direction (in the direction of the arrow F in Figure 3) will swing the arms 24 and 25 counterclockwise which will exert a direct push on the rod 27 and on the rod 31, since pins 26 and 35 will engage the left-hand ends of the respective slots 43 and 34. The rod 31 will immediately swing the clutch-actuating lever 19 counterclockwise, but limited movement of the rod 27 will be permitted before it swings the gear shift lever 17 clockwise due to the provision of the slot 29. After the clutch is completely disengaged, the spring 32 will start to compress and the right-hand end of the slot 29 will contact the pin 30 and swing the lever 17 clockwise to shift the unit 14 into forward drive. During this forward shifting operation, the rod 36 is not actuated since the arm 23 is swung counterclockwise and pin 40 will merely move toward the opposite or right-hand end of the slot 39. The unit 14 is now in forward drive but the clutch is disengaged. However, if the operating lever 21 is released, the compressed spring 32 will expand and return that lever to clutch-engaging position and at the same time permits sufficient clockwise movement of the lever 19 to cause engagement of the clutch to drive the drum forwardly for mixing. The slot 43 in the clevis 42 on the rod 27 will permit the necessary return movement of the lever 21 during re-engaging of the clutch without causing the rod 27 to shift the lever 17 of the unit 14 again. Similarly, in shifting the lever 21 in a reverse drive direction for discharge (in the direction of the arrow R in Figure 3) the arm 23 will be swung clockwise and will exert a direct push on the rod 36 to swing the clutch-actuating arm 19 counterclockwise. At the same time, the arms 24 and 25 are swung clockwise, and after a short delay due to the slots 29 and 43 a pull will be exerted on the rod 27 which will actuate the gear shifting lever 17 but this will be after the clutch is completely disengaged. The rod 36 will move to a sufficient extent to disengage the clutch and as the spring 37 is compressed, the rod 27 has been pulled to such an extent that the pin 30 is in the end of the left-hand end of the slot 29 so that the unit 14 will be shifted into reverse condition as the spring 37 is compressed. Then when the lever 21 is released, the spring 37 will expand, returning the lever to clutch-engaging position, the slot 43 permitting the necessary return movement without causing the rod 27 to shift the lever 17 of the unit 14. In the meantime, no pull will be exerted on the rod 31 because of the provision of the slot 34.

In Figures 5 to 7, we have illustrated another form of the control. The actuating rods and connections are somewhat different and, in addition, the control actuates a brake unit which prevents rotation of the mixer drum whenever the clutch is disengaged.

The relative positions of the engine 11a, the driving clutch 13a, the reverse gear unit 14a, the multi-speed gear unit 15a, the brake unit 50, and the drum 10a are shown in Figure 7. The rod 27a which actuates the lever 17a of the reversing unit 14a is in the form of telescoping tubes connected by simple pivots 30a and 26a, respectively, to the lever arms 17a and 25a. The telescoping tubes are connected by a pin 51 and a slot 52 which permits the necessary lost motion during shifting and reengagement of the clutch. The clutch-actuating rods 31a and 36a are connected to the lever arm 19a of the clutch unit 13a by the simple pivot 41a and to the lever arm 23a and lever arm 24a by the simple pivots 35a and 40a. For the necessary lost motion of each rod during the clutch-disengaging thrust on the other rod, each rod includes a pin 53 which slidably fits in a sleeve member 54 that is pivoted directly to the associated lever arm 23a or 24a. The respective rods 31a and 36a also have associated therewith the compressible springs 32a and 37a.

The lever 19a also actuates a connecting rod 55. This rod is a brake-actuating rod which actuates a cam 56 that applies or releases the brake unit 50. One end of the rod 55 is connected to the arm 19b at the pivot 41b. The lever arms 19a and 19b are keyed to the same transverse shaft 58. The opposite end of the rod 55 is connected to the cam 56 by the pivot 57. Whenever the arm 19a is moved away from clutch-engaging position, the brake 50 is applied by the rod 55 to prevent rotation of the drum 10a during shifting of the unit 14a.

Figure 5a illustrates the sequence of operations of the control mechanism of this form of our invention. This form operates like that previously described except that, in addition, each time the clutch is disengaged, the brake is applied.

Thus, with this form of our control, the movement of the control lever 21a from normal clutch-engaging position will disengage the clutch and apply the brake and then will shift the unit 14a into forward or reverse drive. Then, if the lever is released the brake will be released and the clutch will be engaged automatically to drive the drum in a forward (mixing), or reverse (discharging) direction. To stop the drum it is merely necessary to shift the main operating lever 21a in either direction to disengage the clutch and apply the brake without moving the lever far enough to shift the unit 14a.

It will be apparent that with both forms of our control mechanism by movement of a single operating lever, the clutch will be disengaged and then the gear unit will be shifted into forward or reverse drive after which the clutch will be automatically reengaged when the lever is released. Also, in one form of our device, the brake for the mixing drum will be applied each time the main operating lever is moved to disengage the clutch and will be released each time as the clutch is reengaged.

Having thus described our invention, what we claim is:

1. In combination with a mixer unit having a rotatable mixing drum, a driving transmission for the drum including a driving clutch unit which is normally engaged and a forward and reverse unit, a single operating lever, and mechanism for connecting said lever to said clutch unit and forward and reverse unit so that movement of the lever in either direction from normal clutch-engaged position disengages the clutch and actuates the forward and reverse unit to drive the drum in a selected direction, and means for automatically returning said lever to clutch-engaging position and re-engaging the clutch.

2. The combination of claim 1 including a brake unit for stopping the drum, and mechanism connecting said brake unit to said lever so that movement of the lever away from clutch-engaged position actuates said brake unit.

3. The combination of claim 1 in which said clutch unit has an actuating lever and said forward and reverse unit has an actuating lever and said connecting mechanism is disposed between said levers and said main operating lever, said connecting mechanism comprising a single operating rod between said forward and reverse unit actuating lever and said operating lever and a pair of operating rods between said clutch-actuating lever and said operating lever, and connections which cause one of the clutch-operating rods to disengage the clutch upon movement of the operating lever in one direction and the other clutch-operating rod to disengage the clutch upon movement in the other direction and permit limited movement of the forward and reverse unit operating rod before actuating such unit.

4. The combination of claim 3 in which said connecting means of the brake unit to the main operating lever comprises a rod between said brake unit and said clutch-actuating lever.

5. The combination of claim 3 in which said automatically re-engaging means for the clutch includes a compressible spring section on each of said clutch-operating rods which compresses during disengagement of the clutch and expands for re-engagement of the clutch and returns the main operating lever to clutch-engaged position.

6. The combination of claim 4 in which said automatically re-engaging means for the clutch includes a compressible spring section on each of said clutch-operating rods which compresses during disengagement of the clutch and expands for reengagement of the clutch and returns the main operating lever to clutch-engaged position.

7. The combination of claim 5 in which the springs balance each other and tend to keep the main operating lever in clutch-engaged position.

8. The combination of claim 7 in which the forward and reverse unit operating rod is connected to the main operating lever by a lost-motion connection which permits re-engagement of the clutch without moving said rod.

9. The combination of claim 8 in which said operating lever is pivoted and is provided with diametrically opposed arms including a pair at one side and a single arm at the other side, said single arm being connected by a pin and slot connection to one of the clutch-operating rods which is pivoted at its other end to said clutch-actuating lever, said pair of arms having one connected by a pin and slot connection to the other of said clutch-operating arms which is pivoted at its opposite end to said clutch-actuating lever and the remaining of the pair of arms being pivoted to one end of said forward and reverse unit operating rod by a pin and slot connection and its other end being connected to said forward and reverse actuating lever by a pin and slot connection.

10. In combination with a driving transmission including a driving clutch unit which is normally engaged and a forward and reverse unit, a single operating lever, mechanism for connecting said lever to said clutch unit and to said forward and reverse unit so that movement of the lever in either direction disengages the clutch and operates the forward and reverse unit, means for automatically re-engaging the clutch and returning said lever to clutch-engaged position, said clutch unit having an actuating lever and said forward and reverse unit having an actuating lever and said connecting mechanism is disposed between said levers and said main operating lever, said connecting mechanism comprising a single operating rod between said forward and reverse unit actuating lever and said operating lever and a pair of operating rods between said clutch-actuating lever and said operating lever, and connections which cause one of the clutch-operating rods to disengage the clutch upon movement of the operating lever in one direction and the other clutch-operating rod to disengage the clutch upon movement in the other direction and permit limited movement of the forward and reverse unit operating rod before actuating such unit.

11. The combination of claim 10 in which said operating lever is pivoted and is provided with diametrically opposed arms including a pair at one side and a single arm at the other side, said single arm being connected by a pin and slot connection to one of the clutch-operating rods which is pivoted at its other end to said clutch-actuating lever, said pair of arms having one connecting by a pin and slot connection to the other of said clutch-operating arms which is pivoted at its opposite end to said clutch-actuating lever and the remaining of the pair of arms being pivoted by a pin and slot connection to one end of said forward and reverse unit operating rod and its other end being connected to said forward and reverse actuating lever by a pin and slot connection.

12. The combination of claim 10 in which said automatically re-engaging means for the clutch includes a compressible spring section on each of said clutch-operating rods which compresses during disengagement of the clutch and expands during re-engagement of the clutch and returns the main operating lever to clutch-engaged position.

13. The combination of claim 11 in which said automatically re-engaging means for the clutch includes a compressible spring section on each of said clutch-operating rods which compresses during disengagement of the clutch and expands during re-engagement of the clutch and returns the main operating lever to clutch-engaged position.

14. The combination of claim 12 in which the springs balance each other and tend to keep the main operating lever in clutch-engaged position.

15. The combination of claim 10 in which each of said rods includes telescoping lost-motion sections.

References Cited in the file of this patent

UNITED STATES PATENTS 1,784,354     Haussmann             Dec. 9, 1930